UNITED STATES PATENT OFFICE 2,364,590

STARCH SIZE

Herman H. Schopmeyer, Hammond, Ind., and Herbert A. Kaufmann, Pelham Manor, N. Y., assignors to American Maize-Products Company, a corporation of Maine No Drawing. Application April 8, 1942, Serial No. 438,210

4 Claims. (Cl. 195—24)

This invention relates to a starch size and particularly to a method and composition for use in making conventionally and quickly a starch size suitable for use in sizing paper.

Starches are widely used in the paper industry as a tub or coating size. For this purpose the starch must be thinned before application to the paper. The thinning is effected to advantage by means of starch liquefying enzymes which are available commercially and are in extensive use in connection with the making of such sizing compositions.

In making paper size by the enzyme treatment the starch is mixed in large proportion with water and the required amount of the enzyme and then warmed to the temperature of enzyme action which is somewhat above the pasting point of the starch. As the temperature of the mass reaches the swelling point of the starch, the composition becomes very heavy in consistency. For several minutes before the enzyme thins the starch, the heated composition is so thick in fact that in some cases steam heating must be discontinued in order to avoid spattering of the pasty mass. In other instances, the agitator must be stopped at this stage, to prevent damage due to overloading of the driving motor, until such time as the enzyme has thinned the mass so that the difficulties are removed.

In order to promote more convenient preparation of the size there has been proposed mixing of the enzyme with the starch some time before the starch is used and there has been proposed also means to prevent acidification by fermentation subsequent to the addition of the whole mass of enzyme.

We have now found that the advantages heretofore realized by the incorporation of all of the enzyme in advance of the preparation of the actual size may be obtained by incorporating less than half and suitably only a fourth to a sixth of the total enzyme requirement, provided the starch used is a cereal starch and the mixture with the initial portion of the enzyme is aged for at least approximately two days, at a pH of about 6 to 7.5 and preferably 6.5 to 7 at a temperature not substantially above 130° F., before the remainder of the enzyme is added and the whole is then subjected to warming to cause enzyme thinning of the composition.

The invention comprises the method of making a size as described and also a starch composition suitable for ready conversion to the size, the said composition including an intimate mixture of a cereal starch and a minor proportion of the starch liquefying enzyme required for thinning the starch to the consistency for use in sizing paper.

The use of such a method and composition decreases the total amount of enzyme required to make a suitably thin starch size in a given time. Also the addition of only a small part of the enzyme initially, followed by the aging referred to, gives certain advantages over the addition of all of the enzyme in advance, including more effective use of the enzyme, a decreased risk in the handling of the relatively expensive enzyme preparation, and economy in inventory values of a given tonnage of the premixed starch and enzyme composition.

The invention is particularly useful in connection with the making of corn starch sizing compositions and will be illustrated by detailed description in connection with such compositions. It will be understood, however, that other cereal starches may be substituted pound for pound for corn starch in the examples given, such other starches that may be used including wheat and rye starch.

The enzyme used in suitably any conventional diastatic enzyme preparation of high starch liquefying and saccharifying power.

The proportion of the enzyme incorporated initially is to advantage about one-half to one-sixth of that to be added subsequently to provide the total enzyme required to give the enzyme thinning during heating of the aqueous suspension of the whole composition. Thus there is added initially about 0.05 to 0.15 part of an enzyme preparation, of Lintner value 90, for 100 parts of starch on the dry basis. The enzyme may be added in the dry form but suitably is in the form of a commercial liquor, in which case the amount of the liquor used is such as to correspond to the stated number of parts of Lintner value 90. If the Lintner value is below or about 90, then the amount of the enzyme is suitably correspondingly increased or reduced.

The invention will be further illustrated by specific examples of the practice of it.

Wet corn starch at a moisture content of 45% to 55%, as it is fed into a vacuum dryer, is treated with a small quantity of liquid enzyme in the neighborhood of 0.05 to 0.1% dry enzyme substance on the weight of the starch. The starch and enzyme mixture is then dried at a temperature not substantially above 160° F. to insure non pasting of the starch and prevent inactivating of the enzyme. After two days at about 50 to 90° F. the starch-enzyme mixture is mixed with 2 to 6 times the amount of enzyme initially used. The resulting mixture is then immediately heated with water to cause the desired thinning, a suitable concentration at this stage being about a pound of starch to 6 to 10 pounds of water. The heating is conducted under conventional conditions except that the time required for a batch at any given temperature of heating is shortened substantially. Thus on a cook at 160° F. we have been able to shorten the total time of thinning and subsequent stronger heating to inactivate the enzyme from 30 minutes to 25 minutes, about 20 minutes being required for the thinning of our composition. The heated material is then cooled to about 120° F. or so for use as a size for paper, to which it is applied in a usual manner.

It will be noted that the temperature is maintained at all times below the temperature of inactivation of the enzyme, after the addition of the initial portion of the enzyme and up to the time when the additional portion of the enzyme has been added and warming has produced the desired thinning.

In another example, dry enzyme is substituted for wet enzyme in the above example.

In a third example, the starch is dried in conventional manner to a moisture content not substantially above 10% to 15%, and, as the starch is being discharged from the drier, a small amount of dry enzyme, say 0.05 to 0.1% of the weight of the starch, is incorporated directly into the starch. The resulting mixture is then made uniform by running through a hammer mill or other suitable mixing device and is bagged as a finished product and used as is the initial mixture of the first example above.

Liquid enzyme may be substituted for dry enzyme in the third example. In this case, the starch is dried preferably to slightly lower than normal moisture content before the enzyme is added, in order that the finished product may come out at normal moisture content.

It is necessary that the pH be adjusted to about 6 to 7.5 and for best results in aging to approximately 6.5 to 7. This is done by adjusting the pH of the wet starch or by adding a suitable buffer to dry starch at the same time the enzyme is added.

The enzyme concentration indicated in the above examples may be varied from about 0.05% to 0.15% of the weight of the starch, all on the dry basis. After incorporating the remainder of the enzyme required, the proportion would be usually about 0.25 to 0.5% of enzyme calculated as enzyme of Lintner value 90.

Particularly satisfactory results are obtained when the enzyme is added to corn starch in wet form containing approximately 25 to 65% of water and the resulting mixture mingled and dried at a temperature below the point of substantial injury to the enzyme, as at 110° to 140° F. so that the enzyme becomes thoroughly distributed and adhered by drying upon the particles of starch.

Using a starch-enzyme mixture made as described herein and containing about 0.25 to 0.5% enzyme of the activity stated, we have found that the addition and thorough incorporation of less than a third to a half of this enzyme total during, just after or just before the starch drying operation, makes a mixture that is readily dispersed in a sizing cook and that gives rapid thinning to the starch during the cook.

It will be understood also that it is intended to cover all changes and modifications of the example of the invention herein chosen for the purpose of illustration which do not constitute departures from the spirit and scope of the invention.

What we claim is:

1. The method of making an enzyme thinned starch size which comprises intimately mixing a cereal starch with an initial portion of starch liquefying enzyme representing less than half of the total enzyme required for thinning, establishing the pH of the resulting mixture at about 6.0 to 7.5, aging the mixture for at least two days at a temperature not substantially about 130° F., then adding the remainder of the enzyme required, suspending the resulting mixture in water, warming the suspension at the elevated temperature of rapid enzyme action on the starch, and continuing the warming until the desired enzyme thinning is obtained, the temperature of the mixture after adding the initial portion of the enzyme being maintained at all times below the temperature of inactivation of the enzyme until after adding the remainder of the enzyme and warming to obtain the said desired enzyme thinning.

2. The method described in claim 1, the starch being corn starch, the amount of enzyme added initially corresponding in activity to about 0.05 to 0.15 part on the dry basis of an enzyme preparation of Lintner value 90 to 100 parts of starch, the pH of the said mixture being established at about 6.5 to 7, and the amount of the enzyme subsequently added being about 2 to 6 times that initially added.

3. The method described in claim 1 including subjecting the product after the said desired enzyme thinning to a higher temperature to inactivate the enzyme, the said initial portion of the starch liquefying enzyme representing about one-half to one-sixth of that of the said remainder of the enzyme added subsequently.

4. The method described in claim 1 including admixing the said initial portion of the enzyme into the starch in wet condition containing approximately 25 to 65% of water and mingling and drying the resulting mixture at a temperature below the temperature of substantial injury to the enzyme, so that the enzyme is thoroughly distributed throughout the starch and adhered by drying upon the particles of starch.

HERMAN H. SCHOPMEYER.
HERBERT A. KAUFMANN.